No. 625,820. Patented May 30, 1899.
A. WILDERMUTH.
ROTARY ENGINE.
(Application filed Apr. 4, 1898.)
(No Model.) 3 Sheets—Sheet 1.
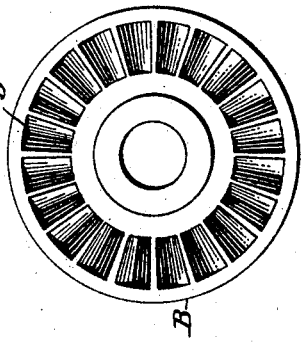
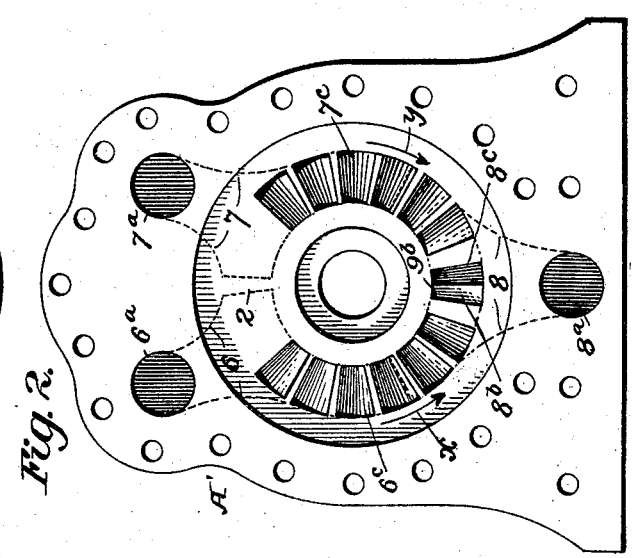
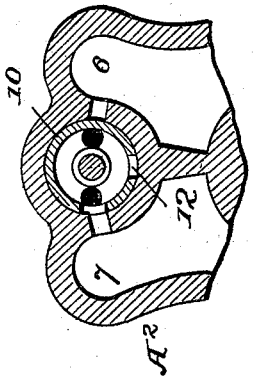
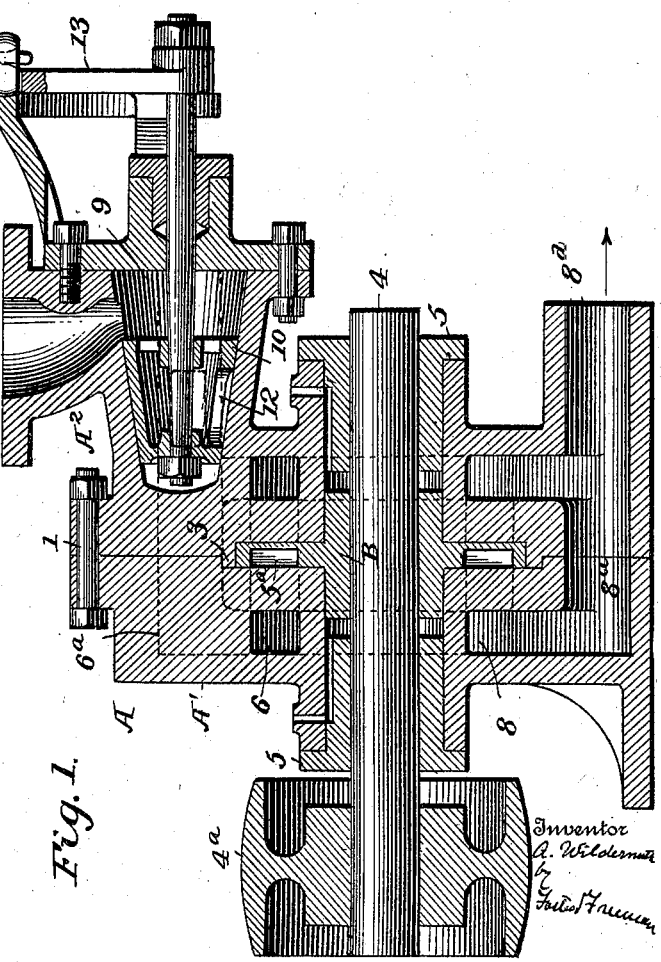

No. 625,820. Patented May 30, 1899.
A. WILDERMUTH.
ROTARY ENGINE.
(Application filed Apr. 4, 1898.)
(No Model.) 3 Sheets—Sheet 2.
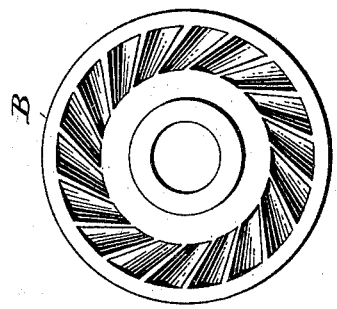
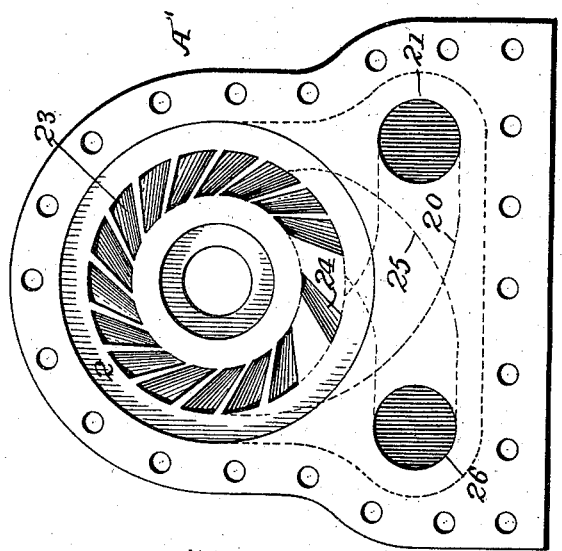
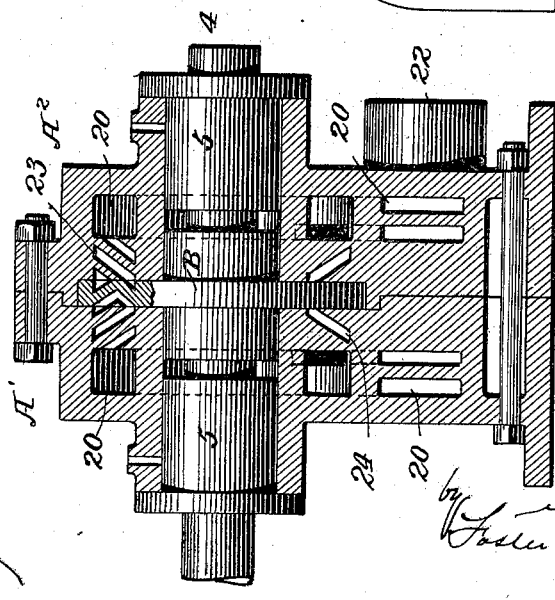

No. 625,820. Patented May 30, 1899.
A. WILDERMUTH.
ROTARY ENGINE.
(Application filed Apr. 4, 1898.)
(No Model.) 3 Sheets—Sheet 3.
Fig. 7.
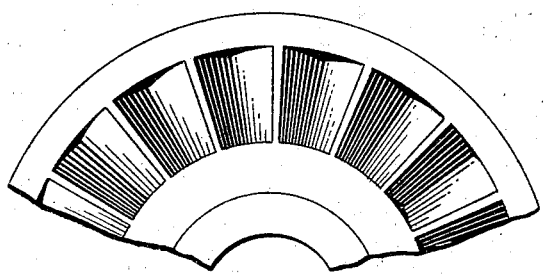
Fig. 8.
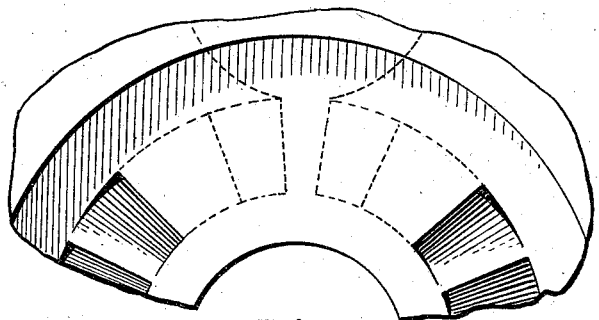
Fig. 9.
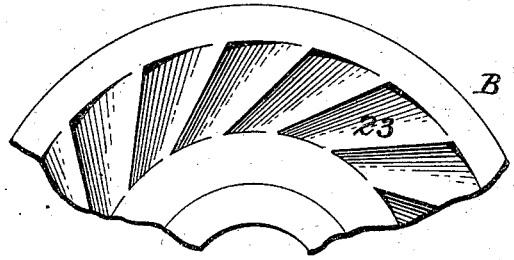
Fig. 10. Fig. 11
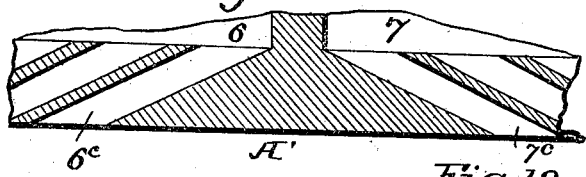 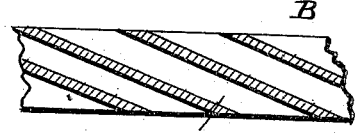
Fig. 12
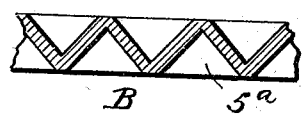
Witnesses Inventor
Adolf Wildermuth
Attorneys

United States Patent Office.

ADOLF WILDERMUTH, OF PATERSON, NEW JERSEY, ASSIGNOR OF ONE-HALF TO GEORGE F. KUETT AND WILLIAM E. FISCHER, OF SAME PLACE.

ROTARY ENGINE.

SPECIFICATION forming part of Letters Patent No. 625,820, dated May 30, 1899.

Application filed April 4, 1898. Serial No. 676,447. (No model.)

*To all whom it may concern:*

Be it known that I, ADOLF WILDERMUTH, a citizen of the Republic of Switzerland, residing at Paterson, Passaic county, State of New Jersey, have invented certain new and useful Improvements in Rotary Engines, of which the following is a specification.

This invention relates to certain new and useful improvements in rotary engines, having for its object to provide an engine of the class described which is simple in construction, durable, and by means of which the maximum efficiency may be attained without the useless expenditure of power.

With these objects in view the invention consists in the novel construction and arrangement of the parts hereinafter more particularly described.

In the accompanying drawings, forming a part of this specification, and in which like letters and figures of reference indicate corresponding parts, Figure 1 is a vertical sectional view of one form of engine embodying the invention. Fig. 2 is a face view of one section of the casing, illustrating the construction and arrangement of the delivery and exhaust ports and passages. Fig. 3 is a side elevation of the piston. Fig. $3^a$ is a detail sectional view of the inlet valve and ports. Fig. 4 is a vertical sectional view of a somewhat different form of engine embodying the invention. Fig. 5 is an inner face view of one section of the casing thereof, illustrating one side of the piston-chamber and the inlet and exhaust ports. Fig. 6 is a side elevation of the piston. Fig. 7 is an enlarged detail view showing the construction of the steam-pockets in the piston of the engine illustrated in Figs. 1 to 3. Fig. 8 is a similar view illustrating the delivery-ports of said engine. Fig. 9 is a similar view illustrating the delivery-ports of the engine illustrated in Figs. 4 to 6. Figs. 10 and 11 are diagrammatic views illustrating the arrangement of the delivery-ports of the engine shown in Figs. 1 to 3 and 4 to 6, respectively; and Fig. 12 is a diagrammatic view showing the arrangement of the steam-pockets of the piston.

Referring to the drawings, and more particularly to Figs. 1 to 3 thereof, A designates the casing of the engine, formed in two sections $A'$ $A^2$, secured together by means of bolts 1, passing through lugs or flanges of the sections. In the opposing faces of the sections are formed circular recesses, which coincide and together constitute the piston-chamber 2. Surrounding the recess of the section $A'$ is an annular flange 3, which projects beyond the face of the said sections for a distance equal to the depth of the recess of the section $A^2$ and is adapted to be received into said recess to form not only a steam-tight joint between the two sections, but also to constitute a continuous unbroken bearing-surface for the periphery of the piston B. This piston B comprises a disk or wheel the sides of which are flat and conform closely to the corresponding side walls of its chamber. Extending centrally through the piston is the driving-shaft 4, which extends through openings in suitable bearings 5 in opposite sides of the casing and projects beyond the same to receive the usual belt-wheel $4^a$ and, if desired, a balance-wheel. (Not shown.) In the opposite faces of the piston B, near the periphery thereof, are formed annular series of steam-pockets $5^a$, which, as shown in Figs. 3, 7, and 12, are wider at their outer ends than at their inner ends. The end walls of these pockets are preferably flat and parallel to the axis of the piston, and their side walls are also formed flat, but converge and meet centrally of the width of the pocket at the bottom thereof. The purpose of this will presently appear. It is desirable that the piston B be as light and occupy as little space as is consistent with durability, and to this end the pockets of the series in one side of the piston are arranged on radial lines intermediate those upon which the pockets upon the opposite side are arranged, as indicated in diagram, Fig. 12.

Formed in each section of the casing are three segmental con-communicating chambers 6, 7, and 8, the chambers 6 of the two sections communicating with each other through a transverse passage $6^a$, the chambers 7 communicating through a similar passage $7^a$, and the chambers 8 through a passage $8^a$. The chambers 6 7 communicate with a common steam-supply pipe 9 through ports $6^b$ $7^b$, respectively, in said pipe, and these ports are controlled by a suitable valve, preferably a rotary valve 10, as shown. This valve is provided with a single port 12, which when the valve is turned to the right registers with the port 6$^b$ and admits steam to the chambers 6, and when the valve is turned to the left said port registers with the port 7$^b$, permitting steam to pass to the chambers 7, the said port 12 being closed when the valve is in its central position. It will thus be seen that only one pair of the chambers 6 7 may be put into communication with the supply-pipe 9 at the same time. Any suitable means may be employed for operating the valve 10, this being effected in the present instance by means of a hand-lever 13, connected to the outer end of the stem of the valve 10.

The steam-chambers 6 7 each communicate with the piston-chamber 2 through a segmental series of delivery-ports 6$^c$ 7$^c$, respectively. These ports extend from the chambers 6 7 diagonally through the walls of the casing, and their mouths conform substantially in shape to the steam-pockets, with which they successively register as the piston B is rotated, and in order to relieve thrusts upon the piston and its shaft at right angles to the axis of the latter the ports 6$^c$ 7$^c$ are so formed that they extend through the walls of the casing concentric with the periphery of the piston, as shown in Fig. 8. The ports 6$^c$, however, extend through the casing-wall in an opposite direction to that in which the ports 7$^c$ extend, (see Figs. 8 and 10,) and the two series of ports direct the flow of steam to the piston-chamber in opposite directions, the steam flowing through the ports 6$^c$ in the direction of the arrow $x$ and through the ports 7$^c$ in the direction of the arrow $y$.

Leading from the exhaust-chamber 8 to the piston-chamber 2 are two exhaust-passages 8$^b$ 8$^c$. These passages extend diagonally through the casing-wall in opposite directions and terminate in a common mouth or port 9$^b$. As hereinbefore stated, the chambers 8 in each section of the casing communicate with each other through a passage 8$^a$, and this passage in turn communicates with an exhaust-pipe 8$^d$.

In operation, assuming the valve 10 to have been turned to cause the ports 7$^b$ and 12 to register, steam will enter the chambers 7 and from thence flow through each of the series of ports 7$^c$ and be directed against the side walls of the steam-pockets of the piston B in a line at right angles to the faces of said walls, causing the piston to be rotated in the direction of the arrow $y$. As the piston continues its rotation the pockets thereof are brought to successively coincide with the exhaust-port 9$^b$ and the steam escapes through the passages 8$^b$ to the exhaust-chamber 8 and from thence out through the exhaust-pipe 8$^d$. When, however, the chambers 6 are placed in communication with the supply-pipe 9, the steam is directed through the ports 6$^c$ to the walls of the steam-pockets opposite to those against which the steam from the ports 7$^c$ impinged and the piston is rotated in the opposite direction, the steam being exhausted from the pockets as they are brought to register with the port 9$^b$ through the passages 8$^c$ and chamber 8.

From the foregoing it will be obvious that a simple and durable rotary engine of exceedingly few parts is produced and one in which steam is directed simultaneously over an extended surface of the piston and at right angles to such surface, thereby rendering it possible to attain a high degree of efficiency. Moreover, by directing steam to both sides of the piston all lateral strain and thrusts are counterbalanced, thereby not only overcoming the vibration which would otherwise result, but preventing excessive wear of the parts. It will be noted, too, that the mouths of the steam-delivery ports are considerably wider than the surfaces which separate the steam-pockets of the piston, thereby rendering it impossible for the engine to become hung on the dead-center.

In Figs. 4 to 6 the construction of the engine is somewhat modified, the piston of the engine being adapted to rotate in but one direction. As shown, each casing-section is provided with a curved steam-passage 20, each of which communicates through a transverse passage or chamber 21 with a common supply-pipe 22, and extending to the piston-chamber 2 diagonally through the walls of the casing from the steam-chambers, all in the same direction, are the delivery-ports 23, which ports are arranged in a circular plane, as indicated in Figs. 9 and 11. Likewise extending through each side wall of the piston-chamber in the plane of the delivery-ports is an exhaust-port 24, each of which communicates through a curved passage 25, extending through the casing, with a transverse passage 26, which in turn is connected with an exhaust-pipe. The delivery-ports 23 instead of being radially arranged, as in the form of engine illustrated in Figs. 1 to 3, are tangential to a common circular plane. Within the piston-chamber 2 is the piston B, which, like the piston previously described, is provided in its opposite sides with annular series of steam-pockets. These pockets are, however, tangentially arranged instead of radially, but are provided with side walls which converge toward the bottoms of the pockets and with end walls which are parallel to each other and to the axis of the piston, the side walls against which the steam impinges being at right angles to the line in which the steam is directed. By this construction it will be seen that steam is directed against the side walls of nearly all of the steam-pockets upon both sides of the piston simultaneously, thereby not only taking up any lateral thrusts or strains upon the piston, but likewise counterbalancing any radial thrust.

It will be understood, of course, that a suitable governor may be employed in connection with the engine for controlling the flow of steam thereto, but as no claim is made herein to such governor and its application and operation are so well understood it is not deemed necessary to show it.

Without limiting myself to the exact construction and arrangement of the parts described, it will be obvious that various changes in such construction and arrangement may be made without departing from the spirit or scope of the invention, since

What I claim is—

1. In a rotary engine, the combination of a casing provided with a piston-chamber and exhaust-passage leading therefrom and two steam-chambers upon each side of the piston-chamber communicating therewith through a segmental series of delivery-ports extending diagonally through the sides of the piston-chamber in a direction concentric to the periphery of the piston, the ports of each chamber upon one side of the piston also extending through the casing in opposite directions and corresponding piston-chambers at the sides of the piston-chamber being arranged opposite each other, a rotary piston within the piston-chamber formed in its face with annular series of steam-pockets having side walls at right angles to the line of the delivery-ports, said pockets being adapted to register successively with the delivery and exhaust ports during the rotation of the piston, substantially as described.

2. In a rotary engine, the combination of the casing provided with a piston-chamber, exhaust-ports, two steam-chambers upon each side of the piston-chamber, each communicating with the piston-chamber through a series of delivery-ports extending diagonally through the side walls thereof in a direction concentric to the periphery of the piston, the delivery-ports of the chambers upon each side extending in opposite directions, and the ports of the corresponding chambers upon opposite sides of the piston-chamber extending in the same direction, the said corresponding chambers at the sides of the piston being arranged directly opposite each other, a piston within the piston-chamber provided in its opposite faces with annular series of steam-pockets, one side wall of each pocket being at right angles to the line of delivery of the ports of a pair of the steam-chambers, and the opposite wall thereof at right angles to the line of delivery of the other pair of steam-chambers, and means for directing steam to either one of the pairs of the steam-chambers, substantially as described.

3. In a rotary engine, the combination of a casing provided with a piston-chamber having exhaust-ports in its opposite side walls and two steam-chambers upon each side of the piston-chamber which steam-chambers are arranged directly opposite each other whereby lateral strains or thrusts upon the piston are counterbalanced and the corresponding chambers upon opposite sides of the piston-chamber communicating with each other, with a supply-pipe and with the piston-chamber by means of a series of delivery-ports extending diagonally through the side walls thereof in a line concentric with the periphery of the piston, the delivery-ports of corresponding chambers extending in one direction and those of the other chambers extending in the opposite direction, and a rotary piston within the piston-chamber provided in its opposite sides with annular series of steam-pockets adapted to register successively with the delivery and exhaust ports, substantially as described.

In testimony whereof I have signed my name to this specification in the presence of two subscribing witnesses.

ADOLF WILDERMUTH.

Witnesses:
S. S. SHERWOOD,
C. S. DE WITT.